US012590676B2

(12) United States Patent
Mackey et al.

(10) Patent No.: US 12,590,676 B2
(45) Date of Patent: Mar. 31, 2026

(54) MINIMIZING RECYCLE FLOW IN PUMP OPERATION

(71) Applicant: Integrated Cryogenic Solutions, LLC, Escondido, CA (US)

(72) Inventors: Michael Mackey, Canyon Lake, CA (US); Fabien Wahl, Las Vegas, NV (US); Shawn Danna, Irvine, CA (US)

(73) Assignee: INTEGRATED CRYOGENIC SOLUTIONS, LLC, Escondido, CA (US)

( * ) Notice: Subject to any disclaimer, the term of this patent is extended or adjusted under 35 U.S.C. 154(b) by 556 days.

(21) Appl. No.: 18/094,892

(22) Filed: Jan. 9, 2023

(65) Prior Publication Data

US 2023/0220954 A1 Jul. 13, 2023

Related U.S. Application Data

(60) Provisional application No. 63/297,431, filed on Jan. 7, 2022.

(51) Int. Cl.
*F17C 5/02* (2006.01)

(52) U.S. Cl.
CPC .................................... *F17C 5/02* (2013.01)

(58) Field of Classification Search
None
See application file for complete search history.

(56) References Cited

U.S. PATENT DOCUMENTS 5,411,374 A 5/1995 Gram
6,640,556 B2 11/2003 Ursan et al.
6,659,730 B2 12/2003 Gram et al.
9,163,785 B2 10/2015 Mackey
2006/0049274 A1* 3/2006 Hume .................... B05B 3/026 239/263
2008/0302111 A1 12/2008 Batenburg et al.

FOREIGN PATENT DOCUMENTS

EP 0168656 B1 1/1986
EP 1331289 A1 * 7/2003 ........ H01M 8/04201
EP 1945997 B1 8/2014
GB 2098874 A * 12/1982 ................ F28B 3/04
WO WO-9859205 A2 * 12/1998 ................. F25J 3/02
WO WO-2006028570 A1 * 3/2006 .......... F16L 27/0828
WO WO-2015097162 A2 * 7/2015 ................ F17C 7/02

OTHER PUBLICATIONS

USPTO/ISA, International Search Report and Written Opinion for PCT Application No. PCT/US23/10432, mail date Apr. 21, 2023. 7 pages.

* cited by examiner

*Primary Examiner* — Jenna M Maroney
(74) *Attorney, Agent, or Firm* — SoCal IP Law Group LLP; Mark Andrew Goldstein

(57) ABSTRACT

An apparatus and method are disclosed for using and constructing a cryogenic fluid pump system for minimizing recycle flow during pump operation. A boost pump, piston pump, and temperature gauges are used to pump cryogenic fluid throughout the system in an energy efficient manner. A phase separator pulsation dampener accumulator is also utilized to prevent the loss of cryogenic liquid to gas and to potentially recirculate cryogenic liquid within the system.

7 Claims, 5 Drawing Sheets

| Substance | Boiling Point | Density |
|---|---|---|
| Liquid Nitrogen ($LN_2$) | -196°C (-320°F) | .807 g/mL |
| Liquid Helium (LHe) | -269°C (-452°F) | 0.125 g/mL |
| Liquid Hydrogen ($LH_2$) | -252°C (-423°F) | 0.07 g/mL |
| Liquid Oxygen ($LO_2$) | -183°C (-297°F) | 1.141 g/mL |
| Liquid Argon (LAr) | -186°C (-303°F) | 1.4 g/mL |
| Liquid Neon (LNe) | -246°C (-411°F) | 0.9 g/mL |
| Liquid Methane ($LCH_4$) | -161°C (-258°F), | 0.5 g/mL |

FIG. 5

MINIMIZING RECYCLE FLOW IN PUMP OPERATION

RELATED APPLICATION INFORMATION

This patent claims priority from provisional patent applications 63/297,431 filed Jan. 7, 2022, the content of which is included by reference in this application in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the storage, use, and processing of industrial gasses, including liquid hydrogen and other cryogenic liquids.

Description of the Related Art

Cryogenic liquids are substances that are liquid at very low temperatures, typically below −150° C. (−238° F.). Cryogenic liquids include liquid nitrogen, liquid helium, and liquid hydrogen. These substances are used in a variety of applications, including refrigeration, medicine, and research. Cryogenic liquids are also used to cool materials to extremely low temperatures for use in scientific experiments and industrial processes. Cryogenic liquids are stored and transported in specially designed containers to prevent them from boiling off or evaporating at room temperature. The special properties of cryogenic liquids come with difficulties in transporting, storing, pumping, and using cryogenic liquids. Often, pumps that use excessive energy corrode over time and lose excessive amounts of cryogenic liquid are utilized. These pumps and systems are expensive and difficult to maintain. They also result in too much loss or not enough loss of cryogenic liquid within the system. Too much loss may be considered 10% or above of the original cryogenic liquid in the system. Too much loss may also mean 10% or above loss of the cryogenic liquid originally stored in the storage tank or vessel.

Developing systems for the use, storage, and pumping of cryogenic liquids is difficult. There are several energy challenges associated with refrigeration for cryogenic liquids. First, efficiency—Cryogenic refrigeration systems tend to be less efficient than systems that operate at higher temperatures. This is because it takes more energy to cool a substance to very low temperatures than it does to cool substances to moderate temperatures (such as temperatures between 32 degrees Fahrenheit or 0 degrees Celsius and 212 degrees Fahrenheit or 100 degrees Celsius at sea level). Heat transfer also poses a problem for cryogenic pump systems because cryogenic liquids are poor heat transfer chemicals due to their low thermal conductivity. It is difficult to effectively transfer heat to or from a cryogenic liquid, which impacts the efficiency of the refrigeration system.

Temperature control is also a major challenge for cryogenic systems. Maintaining a consistent temperature is critical when using cryogenic liquids for refrigeration. Large fluctuations in temperature impact the performance of the refrigeration system and may even cause the cryogenic liquid to boil off or evaporate. Temperature compressors for liquid cryogenic systems are difficult to design, maintain, and operate. Cryogenic refrigeration systems often use compressors to circulate the cryogenic liquid and remove heat from the system. These compressors are expensive to operate and maintain, which impacts the overall cost of the refrigeration system. Additionally, many compressors add heat to the system which defeats the purpose of a liquid cryogenic system.

Finally, safety is a big concern when dealing with cryogenic liquids because cryogenic liquids are often stored and transported under high pressure. This poses a safety risk if a container is not properly designed or maintained. There is also a risk of cryogenic liquids boiling off or evaporating if the refrigeration system fails. This is dangerous when the cryogenic liquid is flammable. Gaseous hydrogen and oxygen which result from the boiling of liquid hydrogen or oxygen are both extremely flammable.

There currently exists a need for a cryogenic fluid pump system that safely pumps cryogenic liquid in a safe, energy efficient manner while allowing for a slight escape of cryogenic gas. The present disclosure solves this problem.

DESCRIPTION OF THE DRAWINGS

FIG. 5. is a table of cryogenic liquids and data pertaining to each liquid.

DETAILED DESCRIPTION

Description of Apparatus

A cryogenic fluid pump system for minimizing recycle flow during pump operation is described herein. Multiple cryogenic liquids may be mixed together and used in the disclosed pump system.

Figure 1:
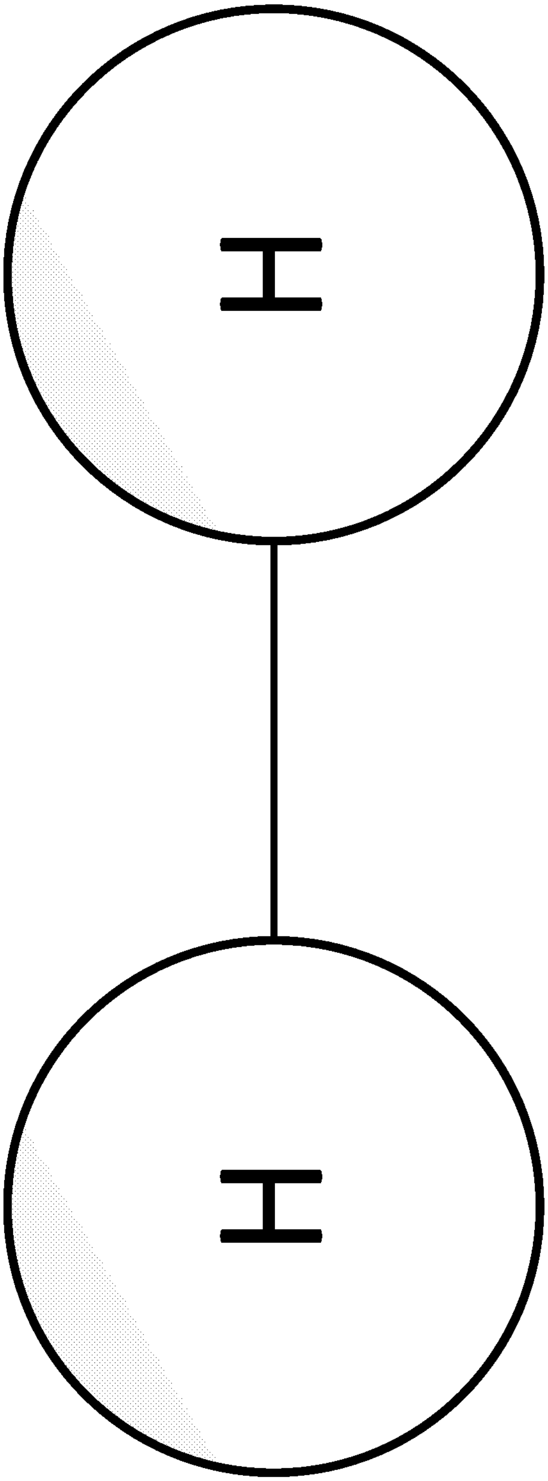
FIG. 1 is a ball and stick model of hydrogen gas.
Figure 2:
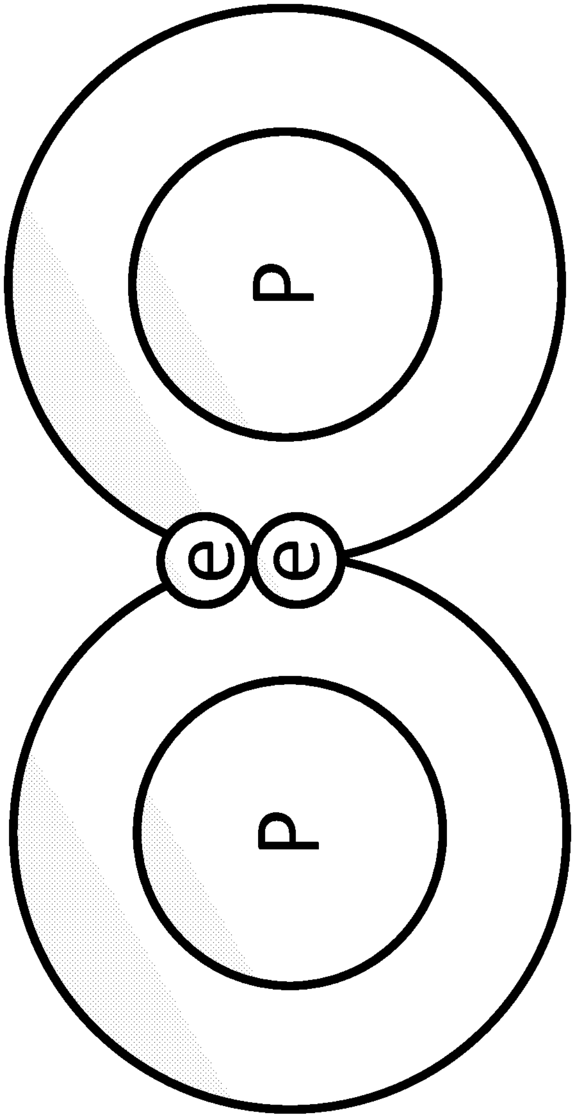
FIG. 2 is a model of hydrogen gas focusing on electrons protons and interactions between atoms.

Liquid hydrogen is a versatile and valuable substance that has many important uses in a variety of different industries. The molecular structure of hydrogen gas as shown in FIG. 1 and FIG. 2 contribute to hydrogen's unique properties as a cryogenic liquid. Hydrogen gas, or diatomic hydrogen, is composed of two hydrogen atoms bonded together by a covalent bond. The molecular formula for hydrogen gas is $H_2$. The molecular structure of hydrogen gas is simple, consisting of just two hydrogen atoms bonded together. One of the key physical properties of hydrogen gas is its low density. Hydrogen gas is the lightest of all gases, with a density of just 0.08988 g/L (sometimes rounded to 0.07 g/mL) at standard temperature and pressure. This low density is due to the small size of the hydrogen atom and the low atomic weight of hydrogen. Another important physical property of hydrogen gas is its flammability. Hydrogen gas is highly flammable and will ignite in the presence of an ignition source. This flammability is due to the chemical reactivity of hydrogen, which is a result of the high energy content of the bonds between the hydrogen atoms in the molecule.

Hydrogen gas has a very low boiling point, with a boiling point of just −252.87° C. at standard pressure. This low boiling point is due to the weak intermolecular forces between hydrogen molecules, which allows them to easily escape from the liquid phase into the gas phase. The low boiling point also allows hydrogen to be an excellent cryogenic liquid as hydrogen may remain a liquid at low temperatures that would make other chemicals solid. Liquid hydrogen may be used as a fuel for rockets. It is extremely lightweight and has a high energy content, making it an ideal choice for use in space travel. Along with rocket fuel, liquid hydrogen is also used in certain fuel cells. Fuel cells are devices that generate electricity through a chemical reaction, and they have the potential to be a clean and efficient source of energy. Liquid hydrogen is used as a fuel in certain types of fuel cells, particularly those that use proton exchange membrane (PEM) technology.

Liquid hydrogen is also used in the production of semiconductors. Some semiconductors are produced through a process called deposition, in which thin layers of material are deposited onto a substrate. Liquid hydrogen is used in some deposition processes as a coolant, helping to maintain the low temperatures that are necessary for the production of high-quality semiconductors. One of the most common industrial uses for liquid hydrogen is in the research and development of coolant and refrigerant. $LH_2$ (liquid hydrogen, the addition of an L to the chemical symbol may indicate the chemical is in liquid form) has a very low boiling point, making it an effective choice for cooling equipment and materials to extremely low temperatures. This is particularly useful in fields such as cryogenics, which involves the study and use of materials at very low temperatures.

Liquid nitrogen ($LN_2$) is a colorless, odorless, and tasteless cryogenic liquid that is produced by cooling and compressing atmospheric nitrogen gas. It is commonly used in a variety of applications due to its unique properties and versatility. One of the main uses of liquid nitrogen is as a refrigerant. $LN_2$'s extremely low boiling point of −196° C. makes it an effective choice for refrigeration and cryogenic storage. It is commonly used to store materials, such as biological samples, food, and industrial chemicals, at extremely low temperatures.

In medicine, liquid nitrogen is used in the treatment of certain skin conditions, such as warts, moles, and skin tags. It is applied to the affected area, causing the tissue to freeze and eventually fall off. It may also be used in cryosurgery, a type of surgery that involves the use of extreme cold to destroy abnormal tissue. Liquid nitrogen may also be used in the production of certain types of food, such as ice cream and frozen foods. It may also be used to rapidly freeze the mixture, resulting in a smoother and creamier texture. In addition, it may also be used in the production and distribution of certain pharmaceuticals, such as vaccines, to ensure that they are kept at the correct temperature during storage and transportation.

Other industrial applications of liquid nitrogen include as a coolant in the production of certain types of steel, and in the production of rubber and other polymers. $LN_2$ is used in the cleaning and processing of electronic components, as it is able to effectively remove contaminants without damaging the components.

Liquid helium is a cryogenic liquid that is produced by cooling and compressing helium gas. It is the coldest naturally occurring substance on Earth, with a boiling point of −269° C., and it has a number of unique properties and uses. One of the most well-known uses of liquid helium is as a coolant. Liquid helium's extremely low boiling point makes it an effective choice for cooling materials and equipment to very low temperatures. It is commonly used in research and development, particularly in the fields of cryogenics and superconductivity. In addition, liquid helium may be used in the production of certain types of electronics, such as MRI machines, which require the use of extremely low temperatures to function properly. Effectively pumping liquid helium and other cryogenic liquids is difficult due to the high energy needs and breakdown of most cryogenic pump systems.

Liquid helium is also used in the production of certain types of fibers, such as fiber optic cables. Fiber optic cables may be produced by drawing glass or plastic through a small hole, called a preform, which is cooled by liquid helium. The low temperatures help to prevent the fibers from becoming deformed or damaged during the production process. In addition to its industrial uses, liquid helium is also used in some scientific research. It is used to study the behavior of matter at very low temperatures, and it is also used to simulate the conditions that exist in outer space.

Liquid oxygen is a cryogenic liquid that may be produced by cooling and compressing oxygen gas. It is pale blue and transparent when in liquid form and when pumped in the disclosed system. One of the main uses of liquid oxygen is as a respiratory gas. When inhaled, it can help patients with certain respiratory conditions to breathe more easily. It is commonly used to treat conditions such as chronic obstructive pulmonary disease (COPD) and asthma. In addition, it is used as a resuscitation aid for people who have experienced a cardiac arrest.

Liquid oxygen is also used in rocket fuel. Liquid oxygen may be used with liquid hydrogen, as the combination produces a high amount of energy when burned. This makes it an ideal choice for use in spacecraft and high-altitude aircraft. In the industrial sector, liquid oxygen is used in a variety of applications. Liquid oxygen may be used as an oxidizer in the production of steel, as well as in the production of certain chemicals. Liquid oxygen may also be used as a cleaning agent, as it is able to effectively remove contaminants from surfaces.

Liquid argon is a cryogenic liquid that is produced by cooling and compressing argon gas. When in liquid form argon is colorless, odorless, and tasteless. One use of liquid argon is as a refrigerant. Argon's extremely low boiling point of −186° C. makes it an effective choice for refrigeration and cryogenic storage. It is commonly used to store materials at extremely low temperatures, such as biological samples and industrial chemicals.

In the medical field, liquid argon is used in the treatment of certain skin conditions, such as warts and moles. It is applied to the affected area, causing the tissue to freeze and eventually fall off. It is also used in cryosurgery, a type of surgery that involves the use of extreme cold to destroy abnormal tissue. In the industrial sector, liquid argon may be used in a variety of applications. Liquid argon may be used as a coolant in the production of certain types of steel, as well as in the production of rubber and other polymers. Liquid argon may be used in the cleaning and processing of electronic components, as liquid argon is able to effectively remove contaminants without damaging the components. Liquid argon is also used in scientific research to study the behavior of matter at very low temperatures, and to simulate the conditions that exist in outer space.

Liquid neon is a cryogenic liquid that is produced by cooling and compressing neon gas. It is a bright red, transparent liquid that has a number of unique properties and uses. One of the main uses of liquid neon is as a refrigerant. Liquid neon's extremely low boiling point of −246° C. makes it an effective choice for refrigeration and cryogenic storage. It is commonly used to store materials at extremely low temperatures, such as biological samples and industrial chemicals.

In the industrial sector, liquid neon is used in a variety of applications. It is used as a coolant in the production of certain types of steel, as well as in the production of rubber and other polymers. It is also used in the cleaning and processing of electronic components, as it is able to effectively remove contaminants without damaging the components. Liquid neon is also used in some scientific research. It is used to study the behavior of matter at very low temperatures, and it is also used to simulate the conditions that exist in outer space. In addition to its industrial and scientific uses, liquid neon is also used in the production of certain types of lighting. Liquid neon may be used in neon lights, which are a type of gas discharge lamp that uses neon gas to produce a bright, glowing light.

Liquid methane is a cryogenic liquid produced by cooling and compressing methane gas. It is a colorless, odorless, and tasteless liquid that has a number of unique properties and uses. One of the main uses of liquid methane is as a fuel. It is a clean-burning fuel that produces relatively low levels of carbon dioxide when burned, making it an attractive alternative to fossil fuels. It is commonly used as a fuel for vehicles and as a feedstock for the production of chemicals.

In the industrial sector, liquid methane is used in a variety of applications. It is used as a refrigerant in the production of certain types of steel, as well as in the production of rubber and other polymers. It is also used in the cleaning and processing of electronic components, as it is able to effectively remove contaminants without damaging the components. Liquid methane is also used in some scientific research. It is used to study the behavior of matter at very low temperatures, and it is also used to simulate the conditions that exist in outer space. In addition to its industrial and scientific uses, liquid methane is also used in the production of certain types of fertilizers. Liquid methane may be converted into ammonia, which is an important ingredient in many fertilizers.

Figure 3:
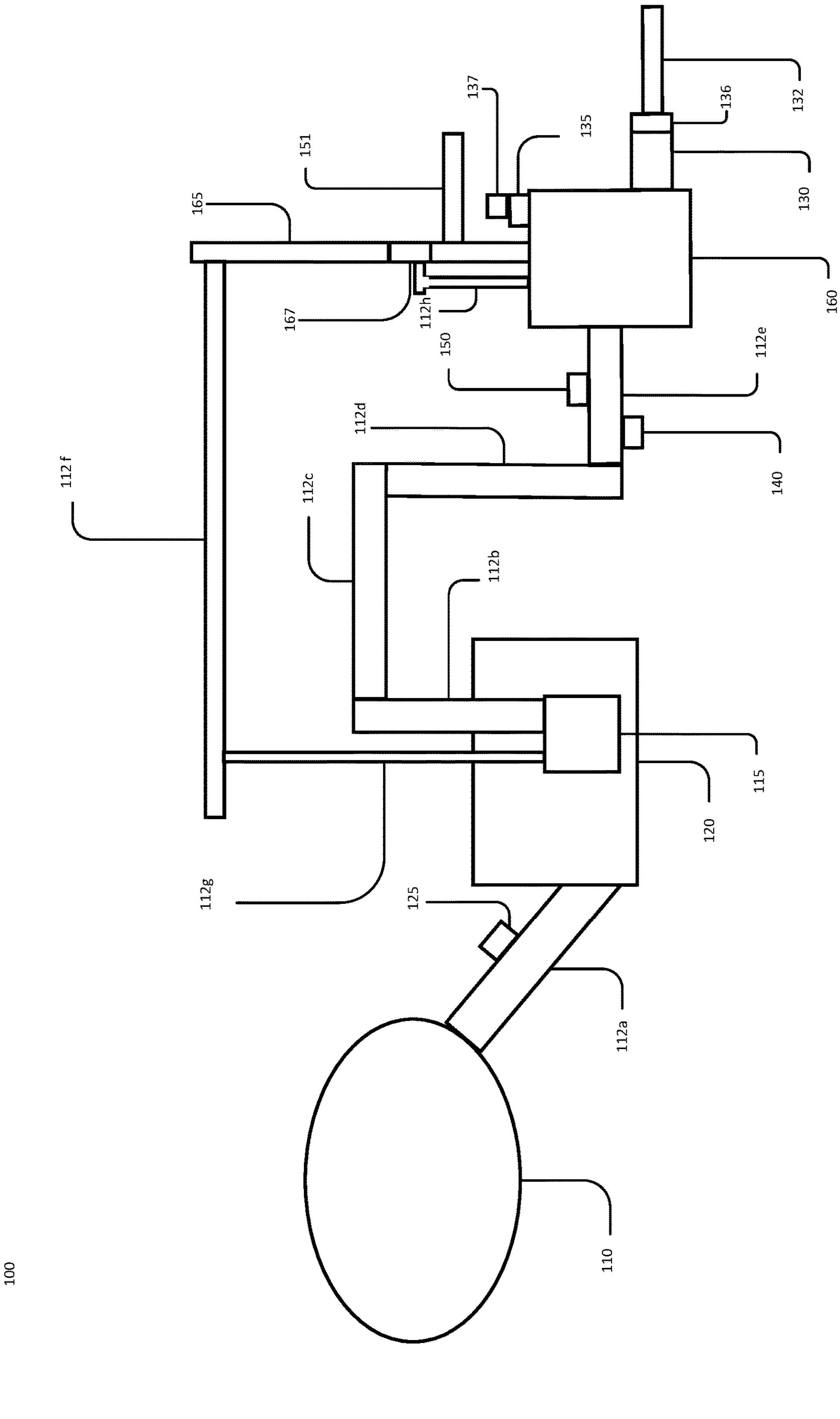
FIG. 3 is a drawing of a cryogenic pump system.

Turning now to FIG. 3, a cryogenic pump system shown. Storage vessel 110 stores liquid cryogenic gas. Liquid hydrogen may be stored in storage vessel 110 but other cryogenic gases such as liquid nitrogen ($LN_2$), liquid helium (LHe), liquid hydrogen ($LH_2$), liquid oxygen ($LO_2$), liquid argon (LAr), liquid neon (LNe), and liquid methane ($LCH_4$) may also be stored in storage vessel 110. Traditional or regular storage vessels may not be appropriate because cryogenic liquids may corrode and degrade traditional storage vessels and tanks. There are several key differences between storage tanks for regular liquids and those for the system described herein. Specific materials must be used for the construction of storage vessel 110. The terms "storage tank" and "storage vessel" are used interchangeably herein. Storage tanks for regular (that is, noncryogenic) liquids are often made from materials such as steel or plastic, while storage tanks for cryogenic liquids are typically made from materials such as stainless steel or special alloys that are able to withstand extremely low temperatures. Aluminum and Titanium are also appropriate metals used for vessel 110. The metals constructing the vessel 110 are thicker than those of traditional or regular vessels.

Another difference is the insulation used in vessel 110. Cryogenic liquids must be stored at extremely low temperatures, so tank 110 is insulated to prevent heat transfer from the surrounding environment. Storage tanks for regular liquids may or may not be insulated, depending on the specific application. The pressure within vessel 110 is also much greater than that of an ordinary tank. Cryogenic liquids are stored at much higher pressures than regular liquids, due to the fact that they are stored at such low temperatures and must keep the atoms compressed to keep the chemicals in liquid rather than gaseous form. As a result, vessel 110 is designed to withstand high pressures, while tanks for regular liquids do not need to be as robust. Finally, there are also differences in the handling and transfer of the liquids. Cryogenic liquids are extremely dangerous to handle, as they can cause severe cold burns if they come into contact with skin. As a result, special safety precautions must be taken when transferring cryogenic liquids, or interacting with vessel 110. Protective equipment should be used when loading cryogenic liquid into vessel 110, as well as when interacting with vessel 110.

There are several types of alloys vessel 110 may be constructed from. One appropriate alloy includes stainless steel. Stainless steel is a strong and corrosion-resistant material that is able to withstand low temperatures and high pressures associated with the storage of liquid hydrogen. It is also relatively inexpensive and widely available. Another appropriate metal includes aluminum or alloys that are a majority aluminum. Aluminum is a lightweight and corrosion-resistant material that is able to withstand the low temperatures of liquid hydrogen. It is also relatively inexpensive, but it is not as strong as other alloys or metals. Denting of vessel 110 may be more common if aluminum is used for construction; aluminum alloys dent less. Titanium is also an appropriate metal to use to construct vessel 110. Titanium is strong, corrosion-resistant, and able to withstand the low temperatures and high pressures of liquid hydrogen storage. It is also relatively lightweight, making it an attractive choice for use in applications where weight is a concern. However, it is more expensive than some other alloys.

In addition to the above metals and alloys, there are also several modifications to vessel 110 that may be used for the storage of liquid hydrogen. These include making vessel 110 a high-pressure tank, a cryogenic tank, and an insulated tank. High-pressure tanks are designed to withstand the high pressures associated with the storage of liquid hydrogen, while cryogenic tanks are specifically designed to store materials at extremely low temperatures. Insulated tanks are used to prevent heat transfer from the surrounding environment and maintain the low temperatures of the stored liquid hydrogen. Vessel 110 should be configured to maintain high pressure, maintain cold liquids, and prevent or limit heat from entering.

Storage vessel 110 is connected to boost pump 115 either directly or through a series of pipes 112*a*. It should be noted that pipe 112 may either be composed of segments (e.g. 112*a* 112*b*, 112*c*, and so on) or be one continues pipe. Boost pump 115 is used to increase the pressure of a fluid or gas such as hydrogen. Boost pump 115 is similar to boost pumps used in fuel systems for vehicles and aircraft, water systems, and industrial processes. There are several types of boost pumps that could be used for boost pump 115, each with its own set of slightly different properties and characteristics.

Boost pump 115 could be a centrifugal pump. Centrifugal pumps use a spinning impeller to generate flow and increase the pressure of the fluid or gas that travels through the pump. Boost pump 115 should be highly efficient and handle a wide range of flow rates and pressures. Centrifugal pumps used in water systems, fuel systems, and industrial processes may be appropriate to use for boost pump 115. Boost pump 115 may also be in communication with several pipes that draw cryogenic liquid to other parts of the system. For example pipe 112*b* draws cryogenic liquid to other parts of the system.

A diaphragm pump may also be an appropriate boost pump to use for boost pump 115. Diaphragm pumps that use a flexible diaphragm to move the fluid or gas and increase the pressure may be appropriate. Diaphragm pumps are favorable when the system will handle a wide range of fluids, including those that are viscous or abrasive. Diaphragm pumps used in fuel systems, water systems, and chemical processing may be appropriate to use for boost pump 115.

Gear pumps are another type of boost pump that could be used for boost pump 115. Boost pump 115 could use interlocking gears to move the liquid hydrogen or gas and increase the pressure to keep the hydrogen atoms in liquid form. The gears could also be used to turn vapor hydrogen back into liquid hydrogen.

In certain configurations, boost pump 115 may be placed in a vacuum insulated sump 120. A sump may be a low-lying area or pit used to collect and store liquid. Sump 120 may be or be comprised of several different forms, including primary sumps, secondary sumps, and tertiary sumps. Primary sumps are the first point of collection for cryogenic liquid, and may be located in areas where cryogenic liquid may accumulate (e.g., at a pipe immediately before a boost pump or in a pipe immediately after the pump). A secondary sump may be used to collect cryogenic liquid from primary sumps, and tertiary sumps may collect from both primary and secondary sumps. It should be noted that sump 120 in FIG. 3 represents a primary sump, a secondary sump, a tertiary sump, or a combination of a primary, secondary, and tertiary sump.

Sump 120 may be equipped with pumps or other mechanical systems to help collect and remove cryogenic liquid and move the cryogenic liquid to the next part of the system. Sump 120 may also be equipped with filters or other treatment systems to remove contaminants or impurities from the liquid. Sump 120 may be used to store and transport cryogenic liquid to be pumped to another location. Sump 120 may be considered a reservoir for the cryogenic liquid, and a pump is used to move the liquid out of the sump and into the desired location, such as a pipe or the next part of the system.

There are several types of pumps that may be used with the sump 120 along with or in addition to the boost pump. These pumps include submersible pumps and pedestal pumps. Submersible pumps are designed to be placed directly into the sump 120, and may be used in smaller sump systems. Pedestal pumps may be mounted on a pedestal above the sump 120 and may be used in a larger sump system. For purposes of this disclosure, pedestal pumps and submersible pumps are considered to be boost pumps. In addition to the pump, sump systems may also include other components, such as valves, pipes, and control systems. These components work together to ensure that the cryogenic liquid is efficiently and effectively pumped from the sump 120 to the next part of the system. The next part of the system may be pipe 112*b* to pipe 112*c* to pipe 112*d*. In other embodiments, a single pipe may be used instead of three separate individual pipes.

Sump 120 may also be a vacuum insulated sump. The vacuum insulated sump 120 is designed to maintain extremely low temperatures by using a vacuum insulation layer. The maintenance of extremely low temperatures is crucial for keeping the cryogenic liquid in liquid form. Vacuum insulated sump 120 may be constructed from stainless steel or special alloys that are able to withstand the low temperatures and high pressures associated with the storage of cryogenic liquids. The vacuum insulation layer may be comprised of a layer of insulation surrounded by a vacuum. The vacuum helps to prevent heat transfer from the surrounding environment, allowing the sump to maintain extremely low temperatures.

Boost pump 115 may pump cryogenic liquid, including liquid hydrogen through a series of more pipes (112*b*, 112*c*, 112*d*) to a chill down valve 140. Chill down valve 140 is used to rapidly cool down the cryogenic liquid within the system. Chill down valve 140 operates by allowing a coolant, such as liquid nitrogen, liquid helium or liquid hydrogen, to flow through the valve and into the system or process that needs to be cooled down. The coolant flows through the valve and into the system or process, and, as it does so, it absorbs heat from the system or process, causing the temperature to drop. Chill down valve 140 is designed with a high flow rate to allow the coolant to flow through the valve and into the system or process as quickly as possible. Chill down valve 140 may also be equipped with special features, such as insulation or heat exchangers, to help improve the cool down valve's cooling efficiency.

Several types of chill down valves may be appropriate for chill down valve 140. Chill down valve 140 may be a ball valve. For this embodiment, the valve opens and closes by rotating a ball-shaped plug in the path of the cryogenic fluid. The terms liquid and fluid are used interchangeably herein. A cryogenic liquid may however refer to a chemical in liquid form. For example, liquid hydrogen may refer to hydrogen in liquid form, whereas fluid hydrogen or hydrogen as a fluid may refer to gaseous hydrogen or liquid hydrogen. In another embodiment, a gate valve is used for chill down valve 140. For this embodiment, the valve opens and closes by sliding a gate into or out of the path of the cryogenic liquid. This embodiment has a high flow rate and ability to handle high pressures. In another embodiment, a butterfly valve is used for chill down valve 140. In this embodiment, the chill down valve 140 opens and closes by the rotating of a disc-shaped plug in the path of the cryogenic liquid, such as hydrogen. Chill down valve 140 may also take the form of a globe valve. In this embodiment, the valve opens and closes by moving a plug up or down in the path of the cryogenic liquid. Chill down valve 140 may also take the form of a diaphragm valve. In this embodiment, chill down valve 140 opens and closes using a flexible diaphragm to seal the flow of the cryogenic liquid.

In other embodiments, other appropriate valves may be used for chill down valve 140, including plug valves, check valves, relief valves and safety valves. Plug valves open and close by using a plug to seal the flow of cryogenic liquid. Check valves allow cryogenic liquid to flow in one direction only.

In some instances, a burp valve 150 is put in fluid communication with one or more pipes that draw cryogenic fluid through the whole system. For example, Though in FIG. 3. burp valve 150 is shown on pipe 112*e* after the chill down valve, the burb valve may be placed at any position that can relieve stress from the system and alleviate an over buildup of pressure. This includes putting the burp valve on the phase separator pulsation dampener accumulator (PSPDA), described below, the piston pump, boost pump, or one or more pipes.

A burp valve is designed to automatically release pressure when it exceeds a level that would harm the overall system. Burp valve 150 allows pressure to be released in a controlled and safe manner. A burp valve may be referred to as a pressure relief valve. When the pressure in the system exceeds the maximum allowed level, the burp valve automatically opens and releases the excess pressure. Once the pressure has been released, the burp valve closes, preventing further pressure release until the pressure in the system or process exceeds the maximum level. Burp valves are beneficial because they do not require controllers or specialized workers such as a human employee to operate.

In addition to preventing overpressure, burp valve 150 prevents the formation of ice or frost. Cryogenic liquids may cause the formation of ice or frost on the surfaces of pipes and other components in the system, which can lead to problems such as reduced flow rates and equipment failure. By releasing pressure through a burp valve, it is possible to prevent the formation of ice or frost in the system.

Too much pressure in the system can harm the system in a number of ways. Cryogenic systems are subjected to extreme temperatures and pressures, and it is important to ensure that the pressure in these systems is kept within safe limits. One of the risks associated with too much pressure in the cryogenic system is the risk of equipment failure. Though the system presented herein describes materials that are able to withstand extreme temperatures and pressures, these materials, metals, and alloys have limits. If the pressure in the system exceeds these limits, the pressure can cause the equipment to fail, which can lead to leaks, spills, and other accidents.

Too much pressure in the cryogenic system increases the risk of leaks and spills. When the pressure in the system exceeds the maximum allowed level, the system can become unstable and prone to leaks and spills. This can damage the system and pose a serious safety risk to people working in the area. For some cryogenic containers too much pressure may be considered 350 psig (pound per square inch gauge) or above. Too much pressure in the system also means 350 psig or more of pressure at a pipe or other part of the system.

The system 100 described herein and in particular in FIG. 3 can be considered an open system or a closed system depending on which part is analyzed. An open system is a system that allows matter and energy to flow freely into and out of the system. An open system is able to exchange matter and energy with its surroundings, and it is not isolated from its environment. A closed system is a system that does not allow matter and energy to flow freely into and out of the system. A closed system is isolated from its environment and does not exchange matter or energy with its surroundings. Most cryogenic pump systems are considered to be closed systems. Indeed, storage vessel 110 may be considered to be a closed system. However as described further below, the current system 100 is designed to lose some cryogenic liquid through time. In the experience of the inventors, this leads to a longer life span of the overall system, reduced leakage of cryogenic liquid over time, and increased energy efficiency.

The system 100 described herein may be considered a combination of an open and a closed system. The system may be considered to be a partially open or partially closed system. Partially open systems allow some matter and energy to flow into and out of the system, while partially closed systems allow only a limited amount of matter and energy to flow into and out of the system. In the current disclosure, some cryogenic liquid that has been pumped is recycled in the system while a small amount leaves the system via various components.

The system 100 described herein allows limited matter and energy to flow freely into and out of the system. System 100 and its embodiments are able to exchange matter and energy with their surroundings, and they are not isolated from the environment. Open cryogenic pump systems are typically used in applications where the pump is required to transfer cryogenic liquids from one location to another, such as from a storage tank to a process or from a tanker truck to a storage tank.

After passing through chill down valve 140, the cryogenic liquid is sent to a phase separator pulsation dampener accumulator (PSPDA) 160. The PSPDA includes both a phase separator, pulsation dampener, and accumulator. The phase separator is a device used to separate different phases of a fluid, such as liquid and gas. The phase separator operates by utilizing the differences in density and other physical properties between the different phases of the fluid. When a fluid is introduced into the phase separator, the lighter phase (such as gas) will rise to the top of the separator, while the heavier phase (such as liquid) will sink to the bottom. This allows the different phases of the fluid to be separated and collected in different parts of the separator.

The PDPDA is particularly useful when liquid hydrogen is used as the cryogenic liquid. The density of liquid hydrogen is much higher than the density of hydrogen gas. At standard temperature and pressure (STP), the density of hydrogen gas can be 0.08988 g/L, while the density of liquid hydrogen may be 70.85 g/L. This is because the molecules in a liquid are much more closely packed together than in a gas, resulting in a higher density.

The PSPDA 160 can be implemented in a variety of different configurations, including the use of a gravity separator, centrifugal separator, and coalescing separator. A gravity separator uses the difference in density between the different phases of the fluid to separate them. Gravity separators used in PSPDA 160 are preferable when little energy is to be exerted in the system 100, but must not be used for cryogenic liquids that have similar density between gas and liquid forms. Centrifugal separators when included in PSPDA 160 use centrifugal force to separate the different phases of the fluid. Coalescing separators when included in PSPDA 160 use a combination of gravity and coalescence to separate the different phases of the fluid. Coalescence is the process by which small droplets of a fluid combine to form larger droplets, and it is commonly used to remove small droplets of a fluid from a gas stream.

A pulsation dampener is also included at PSPDA 160. A pulsation dampener is a device that reduces or eliminates pulsations in a fluid handling system. Pulsations are periodic fluctuations in pressure or flow rate that can occur in a system and may cause problems such as equipment damage and reduced system efficiency. The pulsation dampener when included in PSPDA 160 operates by absorbing or dissipating the energy of the pulsations as they pass through the dampener. Several types of pulsation dampeners could be included in PSPDA 160.

In one embodiment, PSPDA 160 includes a bladder dampener. A bladder dampener may be favorable as it uses a flexible bladder that expands and contracts as the pulsations pass through the dampener. The energy of the pulsations is absorbed by the expansion and contraction of the bladder, which helps to reduce or eliminate the pulsations. In another embodiment, the PSPDA includes a diaphragm dampener. This dampener may be configured to include a flexible diaphragm that moves in response to pulsations. The energy of the pulsations is absorbed by the movement of the diaphragm, which helps to reduce or eliminate the pulsations.

The PSPDA 160 may include an accumulator. The accumulator stores some cryogenic fluid in the system. The accumulator may be considered a reserve of fluid that maintains a consistent flow rate or pressure. In this embodiment, the accumulator included in PSPDA 160 operates by storing the fluid in a container or vessel and allows the cryogenic fluid and/or liquid to flow into and out of the accumulator as needed. When the flow rate or pressure in the system decreases, the accumulator may release fluid to maintain a consistent flow rate or pressure. When the flow rate or pressure in the system increases, the accumulator takes in fluid to prevent the flow rate or pressure from exceeding the maximum allowed level. Contrast the operation of the PSPDA with burp valve 150, exhaust discharge 132, unloader valve 167, and recirculation pipe 165. All four of these components affect the pressure of the system 100, but the accumulator at 160 does so with little loss of cryogenic liquid. The combination of all five of these components is unique because though all five address the same issue, too much pressure in the system, the combination of all five leads to a synergy and unexpected result of less cryogenic liquid lost as the system operates.

Unloader valve 167 can be a mechanical device that controls the flow of fluids or gases in recirculation pipe 165. Unloader valve 167 may stop or redirect the flow of cryogenic gas in recirculation pipe 165 as needed. For example, if system 100 needs to be shut down for safety concern or because there is a catastrophic loss of pressure (because the storage vessel or pump is damaged), unloader valve 167 may direct cryogenic gas (and thus pressure) back to the PSPDA while chill down valve 140 locks to prevent too much loss of cryogenic gas from the system 100. Several designs of unloader valve for unloader valve 167 may be appropriate. Unloader valve 167 may be a pilot-operated unloader valve, poppet unloader valve, and/or solenoid unloader valve.

A pilot-operated unloader valve may open and close based on the pressure of the fluid or gas being transported. A pilot-operated unloader may be used when precise control of flow is required and may be used in conjunction with pressure sensors or other control devices. Poppet unloader valves, use a movable barrier or “poppet” to block or allow the flow of cryogenic liquid. Poppet valves may be used in high-pressure systems as they have high durability and reliability. Solenoid unloader valves, use an electromagnet to actuate the valve and control the flow of fluid or gas.

Using PSPDA 160 that includes an accumulator plays a vital role in ensuring the safety, reliability, and efficiency of the system 100. The accumulator used in PSPDA 160 stabilizes the system by providing a reserve of fluid used to maintain a consistent flow rate or pressure, and helps to protect the system against overpressure and under-pressure. In certain instances, the accumulator used in PSPDA 160 may consist of a container or vessel that is equipped with an inlet and an outlet for the cryogenic liquid. The inlet and outlet may be connected to the system by pipes or tubes, and the accumulator may be installed in a location that is easily accessible for maintenance and inspection.

Piston pump 130 then draws cryogenic liquid from the PSPDA 160 to one or more of several components, including an exhaust discharge station 132, a discharge station 151, an unloader valve 167, and a recirculation pipe 165. The exhaust discharge station 132 is designed to expel debris and excess cryogenic gas from the system. The discharge station 132 only expels cryogenic gas. Stations 151 and 132 may be composed of a number of components, such as valves, regulators, flow meters, and safety interlocks. These components may be used to control the flow of the cryogenic gas and to ensure that it is handled safely during the transfer process. The stations may also include protective barriers or enclosures to prevent accidental exposure to the gas.

Piston pump 130 may be constructed from a single or multiple positive displacement pump(s) that use a piston or plunger to move a fluid through a system. The piston may be attached to a rod or a shaft that is driven by a motor or other power source. As the piston moves back and forth within a cylinder or other chamber, it creates a pumping action that moves the fluid through the system. Appropriate pumps for use at 130 include reciprocating piston pumps, diaphragm pumps, and hydraulic pumps. For a reciprocating piston pump implementation, linear motion is used to move the piston back and forth within a cylinder. For a diaphragm pump implementation, a flexible diaphragm is used to move fluid through the system. For a hydraulic pump implementation, pressurized fluid is used to move the piston and create the pumping action. A chill down valve 140 may be configured to open and direct the cryogenic liquid from the boost pump 115 when the cryogenic liquid is at a liquid temperature to a piston pump 130 The chill down valve 140 may be configured to close once the piston pump is primed and running.

Piston pumps may be arranged in series or in parallel to increase the flow rate or pressure of the system 100. For a series connection, the piston pumps are attached by connecting the outlets of one pump to the inlets of another pump. This creates a system 100 in which the pumps are working in sequence, with each pump adding to the flow rate or pressure of the system.

For a parallel configuration, the piston pumps are attached by connecting the outlets of one pump to the inlets of another pump, and connecting the inlets of both pumps to a common supply line (for example, chill down valve 140 or pipe 112). This creates a system in which the pumps are working simultaneously, with each pump contributing to the overall flow rate or pressure of the system.

Putting piston pumps together in series or in parallel increases the flow rate or pressure of a system, but may also have some drawbacks. One drawback is that it can be more complex to design and operate a system with multiple pumps, and it may be more expensive to maintain and repair. Additionally, if one pump fails, it can affect the performance of the entire system.

There are several special considerations that must be given to piston pump 130 when used with cryogenic fluids. The materials used to construct pump 130 must be stable enough to withstand cryogenic liquids. Cryogenic fluids can cause materials to become brittle and prone to failure, so it is important to use materials that are suitable for use with cryogenic fluids. Common materials that are used in cryogenic piston pumps include stainless steel, aluminum, and brass.

Another important consideration is the seals and packings within various pumps of the system that are used to prevent leakage. Cryogenic fluids can cause seals and packings to become brittle and prone to failure, so it is important to use materials that are suitable for use with cryogenic fluids. Seals and packings such as piston ring 136 may be constructed from materials including fluoropolymers, such as PTFE (polytetrafluoroethylene) and FKM (fluorine rubber also spelled and referred to as fluoro-rubber), and other metals and metal alloys.

It is also important to consider the lubrication of the pump 130. Cryogenic fluids can cause the lubricant in the pump 130 to become too viscous or to become solid, which can lead to equipment damage and reduced performance. Too viscous that prevents the free flow of cryogenic liquid within the pipes. means a viscosity. To prevent these problems, it is important to use lubricants that are suitable for use with cryogenic fluids, and to carefully monitor the lubrication of the pump to ensure that it is functioning properly.

Piston ring 136 is a mechanical seal that is used in piston pump 130 to prevent leakage of fluid past the piston. In actuality there will be some leakage from piston ring 136, but this is by design and necessity. Piston ring 136 may be constructed from metal and may be installed around the circumference of the piston of piston pump 130 in a groove or channel. Piston ring 136 operates by creating a tight seal between the piston and the cylinder of piston pump 130 or other housing in which the piston ring is installed. As the piston of piston pump 130 moves back and forth within the cylinder, the piston ring creates a seal that prevents an excessive amount of fluid from leaking past the piston. Piston rings are an important component of the piston pump 130 and play a vital role in ensuring the efficiency and reliability of the pump. If the piston rings 136 are too damaged or worn, it can cause too much leakage of the cryogenic liquid, which can lead to reduced performance and equipment damage. Too much leakage means leakage that results in 10% or more of the cryogenic liquid leaving the system, or enough loss of cryogenic liquid that causes the system to stop functioning. Aluminum is a lightweight and corrosion-resistant material that is able to withstand extreme temperatures and pressures, and, as such, the piston rings may preferably be made from aluminum.

Cryogenic liquid may turn to gas and leak from a piston ring if the seal provided by the piston ring is not sufficient to contain the liquid. This can occur if the piston ring is damaged, worn, or improperly installed, or if the pressure or temperature in the system exceeds the limits of the piston ring. Additionally, because the atoms making up cryogenic liquid are small, as energy is applied to the liquid and some of the cryogenic liquid turns to gas, some cryogenic liquid will be lost through piston ring 136 regardless of how secure it is. If excessive amounts of cryogenic liquid turn to gas and leak from a piston ring, it can cause a variety of problems, including reduced performance and efficiency of the pump, equipment damage, and safety hazards.

To prevent cryogenic liquid from turning to gas and leaking from a piston ring, it is important to ensure that the piston ring is in good condition and properly installed, and to carefully monitor the pressure and temperature in the system to ensure that they remain within safe limits. It is also important to use materials that are suitable for use with cryogenic fluids and able to withstand the extreme temperatures and pressures that are encountered in cryogenic systems. A piston ring may be designed to allow for slight leakage of cryogenic gas from liquid form to be good for the system in certain circumstances. This is typically done to allow the system to vent excess pressure or to allow gas to be bled off to prevent overpressure.

Recycle flow refers to cryogenic liquid that is recycled within the system. This means cryogenic liquid that makes its way from storage vessel 110 through the system and then back to boost pump 115 via pipe 112*f* and 112*g*. A goal of the present disclosure is to reduce the amount of recycle flow through the system while the pumps are operating.

In the cryogenic system 100, it is important to carefully control the pressure and temperature to ensure that the system is operating safely and efficiently. If the pressure or temperature in the system exceeds certain limits, it can cause problems such as equipment damage or safety hazards. To prevent these problems, in one embodiment, the system allows for slight leakage of cryogenic gas from liquid form. This is achieved by designing the piston ring 136 to allow for a small amount of leakage, or by installing a separate vent or bleed valve in the system 100. In other embodiments, other components of the system such as unloader valve 167, burp valve 150, and exhaust discharge 132 may be configured to contribute to the small, controlled amount of cryogenic liquid escape that keep the overall system secure.

Allowing for slight leakage of cryogenic gas in liquid form can be beneficial for the system in certain circumstances, as it can help to prevent overpressure and maintain the system within safe operating limits. However, the system 100 provides for careful control of and monitoring the leakage to ensure that the system 100 operates within safe limits, and to prevent excessive leakage that could compromise the efficiency or reliability of the system 100.

Exhaust discharge 132 is used to remove (evacuate) excess cryogenic gas that leaks from piston ring 136. Exhaust discharge 132 may be used in a cryogenic system to remove waste gases or other byproducts that are produced during the operation of the system. The cryogenic system 100 generates gases as a byproduct of the cooling and storage process of the cryogenic liquid, and, pursuant to the design and configuration of the systems 100, these gases are safely and effectively removed from the system 100 to prevent build-up and maintain safe and efficient operation.

Exhaust discharge 132 may be implemented using several different types of exhaust discharge systems. Exhaust discharge 132 may be or include one or more of exhaust pipes, mufflers, and catalytic converters. Exhaust pipes may be used to carry the exhaust gases away from the cryogenic system. They typically consist of a series of tubes or pipes connected to an exhaust manifold and run to the exterior of the system. Exhaust gases are cryogenic liquid that has turned to gas and will not turn back to liquid within the system. Mufflers may also be used to reduce the noise that is produced by the system. A muffler may be configured to include chambers, baffles, and other components to dampen the sound waves that are produced by the exhaust gases. Reduction of sound waves is important because sound waves contain energy which may heat up cryogenic liquid turning it to gas.

The system 100 may include two separate temperature gauges, a first temperature gauge 125 and second temperature gauge 135. In some instances, the temperature gauges themselves may also be controllers that influence other parts of the system. In other instances, a separate controller such as controller 137 may be in communication with temperature gauges and affect their operation. Temperature gauge 125 may be in communication with storage vessel 110, pipe 112 or boost pump 115. The purpose of temperature gauge 125 is to verify that the cryogenic liquid from storage vessel 110 is sufficiently cold to be transported to the system via boost pump 115. Cryogenic liquid must be below its boiling point (as outlined in FIG. 5) to be transported within the system.

Various kinds of temperature gauge 125 and 135 may be used in the system 100. The temperature gauge may be a dial thermometer which contains a temperature-sensitive element, such as a bimetallic strip or a thermocouple, to measure the temperature of a liquid, gas, or component of the system. The temperature-sensitive element may expand or contract in response to changes in temperature. This contraction and/or expansion is used to rotate a pointer on the dial of the thermometer. The position of the pointer on the dial indicates the temperature of the liquid, gas, fluid, or component of the system. This pointer may be coupled with a digital system that generates a signal that can be sent to a controller to take action to effectuate a change in the system.

The temperature gauge 125 and 135 may be a digital thermometer. A digital thermometer may be configured to contain a temperature-sensitive element, such as a thermocouple or a thermistor, to measure the temperature of a substance or system. The temperature-sensitive element produces a small electrical current or voltage, a signal, in response to changes in temperature, and the signal is used to measure the temperature of the liquid, gas, fluid, or component or a component of the system.

A controller 137 may be used to keep the temperature of the cryogenic liquid within a certain range. Controller 137 may include a temperature sensor, such as a thermocouple or a thermistor, to measure the temperature of the cryogenic fluid, and use this information to control a heating or cooling element, such as a heater or a compressor, to maintain the temperature of the cryogenic fluid within a certain range.

A temperature gauge included in the system 100 must be properly calibrated and functioning correctly. The temperature-sensitive element of the thermometer or temperature gauge is located and applied to a portion of the system that can give an accurate measure of temperature (including the pipe, pump, or valves). This may be a bimetallic strip, a thermocouple, a thermistor, or some other type of temperature-sensitive element. The temperature-sensitive element must be put in contact with the cryogenic liquid that is being measured. The element should be fully submerged in the liquid, if possible. In other instances, the temperature gauge may be coupled to and used to calculate the temperature of an alloy or metal of a component that is in contact with cryogenic liquid at liquid temperature in the system. The thermometer or temperature gauge must stabilize before giving an accurate reading. This may take a few minutes, depending on the specific thermometer or temperature gauge being used. The terms temperature gauge and thermometer are used interchangeably herein.

Controller 137 may be a device or electronic system used to control the operation of other devices or elements of the system 100. Controller 137 may be used to control a variety of different devices and components in the system 100, including gauges and valves. The controllers may include one or more of each of programmable logic controllers (PLCs), microcontrollers, and computer-based controllers.

Programmable logic controllers (PLCs) are specialized computers used to control industrial systems. A PLC may be programmed using a specialized programming language and used to control a variety of different devices and systems, including gauges and valves. Microcontrollers are small, single-board computers used to control a variety of different devices and systems. They may be smaller, more compact systems, and may be programmed using a variety of different programming languages. Computer-based controllers are based on a computer or other computing device and may be used to control a variety of different devices and systems, including gauges and valves. Computer-based controllers can be programmed using a variety of different programming languages and may be used to control a wide range of different devices and systems.

To use a controller to control gauges and valves, the controller is programed to perform the desired control functions. This may involve writing code or creating a control program that specifies the specific control functions that the controller should perform. Once the controller has been programmed, it can be used to control the operation of the gauges and valves as desired to achieve the functionality of the system 100. When a valve or device is attached to a pump in the system 100, the actual device or valve may be attached to a pipe that is connected to the pump. For example, boost pump 115 is connected to PSPDA via pipe 112*b*, pipe 112*c*, pipe 112*d*, and chill down valve 140. However boost pump 115 may have also be connected to chill down valve 140 directly, or via only one pipe. System 100 is only one potential embodiment of the system, and more or less piping such as piping 112*a* could be used to connect other components together.

Figure 4:
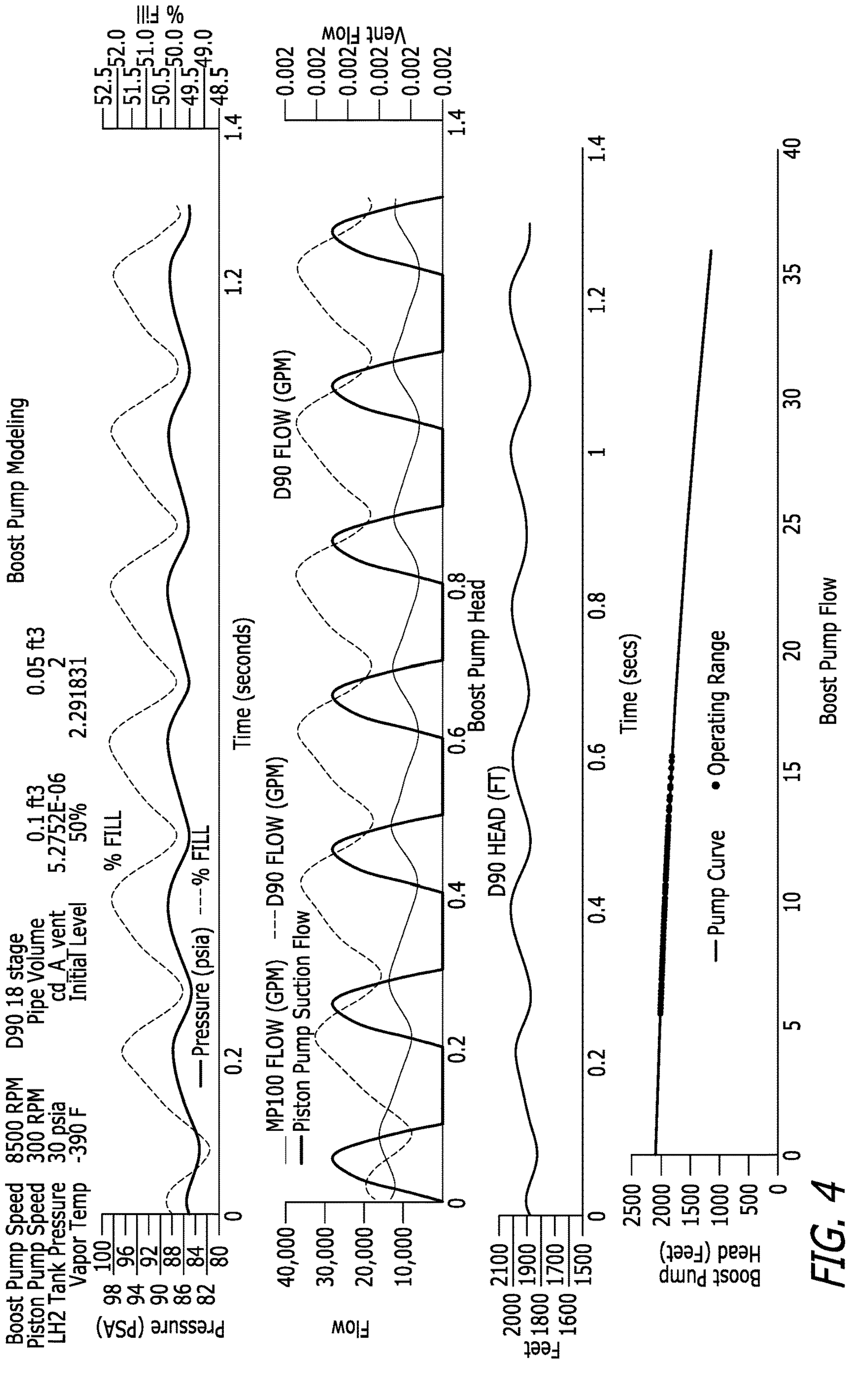
FIG. 4 is a collection of graphs demonstrating different phases of a piston pump for pumping cryogenic liquid.

Turning to FIG. 4, data related to boost pump modeling is graphically displayed. Piston pump 130 may use a reciprocating piston to move cryogenic liquid within the system 100. As the piston moves back and forth within a cylinder, a pumping action results that moves the cryogenic liquid from one location to another in the system 100. The graph shows several important data points. Feet, or feet of head, refers to the vertical distance that the fluid or gas is being pumped. It may be measured in units of feet or meters. Flow refers to the rate at which the fluid, gas, or liquid is being pumped. It may be measured in units of gallons per minute (gpm) or liters per minute (1 pm). Head, or pressure head, refers to the pressure that is being applied to the fluid or gas in order to move it through the pump. It is typically measured in units of pounds per square inch (psi) or kilopascals (kPa). PSI, or pounds per square inch, is a unit of pressure.

To graphically explain how the piston pump operates, a diagram showing the cylinder and piston, along with a graph of the flow rate of the fluid or gas as a function of time may be displayed to a human operator or the data from the graphs sent to a database that may be accessed to access the condition of the system. A graph of the feet of head or pressure head as a function of time to show how these variables change during the pumping process is also useful. Specifically, this data is useful in programming a controller for the system. As cryogenic liquid is converted to cryogenic gas, too much gas might adversely affect the pistons pumping. Deviation from the graph of FIG. 4 is a sign there is an error in the system and that operations should be stopped, or liquid should be released.

FIG. 5 shows the boiling point and density of several cryogenic liquids. Density is an important property of a cryogenic liquid because it affects how much of the liquid is required to fill a given container. A liquid with a higher density will have a greater mass for a given volume, meaning that less of it is needed to fill a container of a given size. This is important when working with cryogenic liquids because they are typically stored in specialized containers that are designed to keep them at extremely low temperatures. Boiling point is also important property to consider when working with cryogenic liquids because it determines the temperature at which the liquid will vaporize. A cryogenic liquid with a low boiling point will vaporize more easily, which can make it more difficult to handle and store. On the other hand, a cryogenic liquid with a high boiling point will be more stable and easier to work with. Cryogenic liquid should be kept below boiling point for the system to operate. Too much cryogenic liquid reaching the boiling point causes increased pressure within the system as well as blow back on the pumps in the system. This is to be avoided.

For purposes of the system sufficiently chilled means below a cryogenic liquid's boiling point. A cryogenic liquid is sufficiently chilled when it is at a temperature below its boiling point, at a temperature below the temperatures outlined in FIG. 5, or at a temperature in which the liquid is still in liquid form and is not a solid or gas. Note that changes to atmospheric temperature may change the temperature at which a cryogenic liquid turns to a cryogenic gas or solid. More pressure on the system will result in a higher temperature required to turn the liquid to gas.

A potential apparatus for the system could include. An apparatus for efficiently handling cryogenic liquid comprising: a storage vessel with an inner and outer portion, the inner portion to store the cryogenic liquid; a boost pump attached to the storage vessel via a pipe, the boost pump in communication with a first temperature gauge, the temperature gauge configured to verify that the cryogenic liquid in the storage vessel is sufficiently chilled to keep the cryogenic liquid in liquid form; a chill down valve configured to open and direct the cryogenic liquid from the boost pump when the cryogenic liquid is at a liquid temperature to a piston pump and to close once the piston pump is primed and running; a second temperature gauge configured to detect when the piston pump is sufficiently chilled to keep the cryogenic liquid in liquid form, the second temperature gauge connected to a controller, the controller in communication with the piston pump; a controller in communication with the piston pump and the second temperature gauge, the controller configured to activate the piston pump when the piston pump is sufficiently chilled to keep the cryogenic liquid in liquid form by referring to the second temperature gauge and to close the chilldown valve; wherein the piston pump has a suction stroke to facilitate receiving cryogenic liquid from both a phase separator pulsation dampener accumulator (PSPDA) and the boost pump; wherein the piston pump is further configured to convert at least some cryogenic liquid to gas and to evacuate the gas through at least a piston ring of the piston pump; a cryogenic liquid discharge station to expel at least some gaseous and/or liquid cryogenic liquid; a cryogenic liquid pump unloader valve connected to the boost pump and/or the PSPDA configured to draw heated gaseous and/or heated cryogenic liquid back to the boost pump or PSPDA to be recycled within the apparatus.

Other configurations could have slight modifications such as the cryogenic liquid being liquid hydrogen and the cryogenic gas that results from the cryogenic liquid being heated is gaseous hydrogen. The boost pump could also be stored in a vacuum insulated sump. The PSPDA could also be connected to a burp valve that expels excessive liquid or gaseous cryogenic liquid. Additionally, some of the cryogenic liquid could not cycle back to the cryogenic liquid tank. The chill down valve could also be configured to connect to more than one piston pump.

Another possible configuration could be expressed as, an apparatus for efficiently storing, pumping and using liquid hydrogen for cryogenic purposes comprising: a liquid hydrogen storage vessel attached to a temperature transmitter; the temperature transmitter attached to a liquid hydrogen boost pump in a vacuum insulated sump, the temperature transmitter further configured to verify if liquid hydrogen is cold enough to be pumped through the boost pump; a second temperature transmitter connected to a controller, the controller detecting whether liquid hydrogen is cool enough to activate a vacuum insulated phase separator pulsation dampener accumulator (PSPDA); a piston pump, chilldown valve, and burp valve connected to the PSPDA; a piston pump seal configured to release at least some liquid hydrogen or gaseous hydrogen as hydrogen passes through the piston pump; a piston pump seal blowby return station configured to return at least some gaseous and liquid hydrogen back to the PSPDA to be chilled back into liquid hydrogen to flow through the PSPDA again. Note a temperature transmitter may be a temperature gauge, a controller, or both.

Other potential configurations include wherein a piston pump discharge check valve is attached to the piston pump, wherein a piston pump suction check valve is attached to the piston pump, wherein a piston pump unloader valve is attached to the piston pump, wherein the piston pump is a simplex piston pump, wherein the piston pump is a duplex or triplex piston pump, wherein there are multiple piston pumps attached in series or parallel to one another.

A potential method for using the above apparatus includes, a method of efficiently pumping cryogenic liquid comprising: providing a storage vessel with an inner and outer portion, the inner portion configured for the safe storage of cryogenic liquid; using a boost pump attached to the storage vessel to pump cryogenic liquid from the storage vessel to a chill down valve; pumping the cryogenic liquid through the chill down valve and a phase separator pulsation dampener accumulator (PSPDA) to at least one piston pump; converting at least a portion of the cryogenic liquid to cryogenic gas and expelling at least some of the cryogenic gas via a piston ring of the piston pump; sending at least some cryogenic liquid and gas to a cryogenic discharge station that expels at least some of the cryogenic liquid or gas from the system; sending at least some cryogenic liquid and gas to the phase separator pulsation dampener accumulator (PSPDA) to be recycled back into the system.

Modifications to the method include using at least two temperature transmitters to verify that the cryogenic liquid is cold enough to be sent through the boost pump, the PSPDA, and the piston pump. The PSPDA may have a burp valve used for expelling excessive cryogenic liquid and/or gas. The PSPDA may also be configured so it separates cryogenic vapor from the cryogenic liquid, so vapor is not sucked into the piston pump. Multiple pistons may be utilized by the piston pump. The piston pump may further be configured to comprise a duplex or triplex piston pump.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for efficiently handling cryogenic liquid comprising:

a storage vessel with an inner and outer portion, the inner portion to store the cryogenic liquid;

a boost pump attached to the storage vessel via a pipe, the boost pump in communication with a first temperature gauge, the first temperature gauge configured to verify that the cryogenic liquid in the storage vessel is below a cryogenic liquid's boiling point to keep the cryogenic liquid in liquid form;

a chill down valve configured to open and direct the cryogenic liquid from the boost pump when the cryogenic liquid is at a liquid temperature to a piston pump and to close once the piston pump is primed and running;

a second temperature gauge configured to detect when the piston pump is sufficiently chilled to keep the cryogenic liquid in liquid form, the second temperature gauge connected to a controller, the controller in communication with the piston pump;

a controller in communication with the piston pump and the second temperature gauge, the controller configured to activate the piston pump when the piston pump is sufficiently chilled to keep the cryogenic liquid in liquid form by referring to the second temperature gauge and to close the chilldown valve;

wherein the piston pump has a suction stroke to facilitate receiving cryogenic liquid from both a phase separator pulsation dampener accumulator (PSPDA) and the boost pump;

wherein the piston pump is further configured to convert at least some cryogenic liquid to gas and to evacuate the gas through at least a piston ring of the piston pump; a cryogenic liquid discharge station to expel at least some gaseous and/or liquid cryogenic liquid;

a cryogenic liquid pump unloader valve connected to the boost pump and/or the PSPDA configured to draw heated gaseous and/or heated cryogenic liquid back to the boost pump or PSPDA to be recycled within the apparatus.

2. The system of claim 1 wherein the cryogenic liquid is liquid hydrogen and the cryogenic gas that results from the cryogenic liquid being heated is gaseous hydrogen.

3. The system of claim 1 wherein the boost pump is stored in a vacuum insulated sump.

4. The system of claim 1 wherein the PSPDA is connected to a burp valve that expels excessive liquid or gaseous cryogenic liquid.

5. The system of claim 1 wherein at least some of the cryogenic liquid does not cycle back to the cryogenic liquid tank.

6. The system of claim 1 wherein the chill down valve is configured to connect to more than one piston pump.

7. The system of claim 1 wherein the piston pump contains more than one piston.

* * * * *